United States Patent [19]
White

[11] 3,908,114

[45] Sept. 23, 1975

[54] DIGITAL HILBERT TRANSFORMATION SYSTEM

[75] Inventor: Stanley A. White, Yorba Linda, Calif.

[73] Assignee: Rockwell International Corporation, El Segundo, Calif.

[22] Filed: Aug. 12, 1974

[21] Appl. No.: 496,789

[52] U.S. Cl. ............. 235/152; 179/15 BC; 235/197

[51] Int. Cl.[2] ........................................ G06F 15/34

[58] Field of Search .................... 235/152, 156, 197; 324/77 B, 77 D; 179/15 B, 15 C

[56] References Cited

UNITED STATES PATENTS

| | | | |
|---|---|---|---|
| 3,585,529 | 6/1971 | Darlington | 332/45 |
| 3,800,131 | 3/1974 | White | 235/197 |

*Primary Examiner*—David H. Malzahn

*Attorney, Agent, or Firm*—H. Fredrick Hamann; Rolf M. Pitts; George Jameson

[57] ABSTRACT

A multiplex mechanization of a Hilbert transformation system is disclosed wherein, in a preferred embodiment, digital sine and cosine signal samples from a reference generator are selectively multiplexed by first and second multiplexing circuits into first and second composite signals. A first multiplier circuit selectively heterodynes the multiplexed sine and cosine signal samples in the first composite signal with input signal samples to develop first and second streams of data which are filtered and then selectively heterodyned with the sine and cosine signal samples in the second composite signal to develop third through sixth streams of data. Output means selectively combines the third through sixth streams of data into first and second output signals, with the second output signal being the Hilbert transform of the first output signal.

12 Claims, 5 Drawing Figures

DIGITAL HILBERT TRANSFORMATION SYSTEM

BACKGROUND OF THE INVENTION

1. Field of the Invention

This invention relates to signal transformation systems for processing received data into in-phase and quadrature data outputs, and particularly to a multiplex mechanization of a Hilbert transformation system.

2. Description of the Prior Art

In the field of communications systems, circuits are frequently required that incorporate filters which process information through two channels in a particular fashion. The information in only one channel is shaped by some specified transfer function, frequently through the use of a narrow-band filter. In addition, it is attempted to phase shift each frequency-component of the signal in the first channel by 90° with respect to the signal in the second channel. This particular type of signal processing is called Hilbert transformation. In the past, various approximations have been developed for achieving the desired signal relationship. In one type of prior art system, the signal information is applied through a bandpass filter to a 90° phase shifter to obtain a Hilbert transformation approximation of the bandpass filtered signal at the output of the phase shifter. In a second type of prior art system, signal information is applied through a bandpass filter to a convolution filter which convolves the signal with a ramp voltage to develop a Hilbert transformation approximation of the filtered output signal from the digital bandpass filter which is applied to a second channel. Basically, these two types of prior art systems are partially successfully trying to construct an all-pass filter to provide a controlled 90° phase shift.

Other proposed signal processing systems for performing Hilbert transformations have been described in published articles. One of these published articles is by L. R. Rabiner and R. W. Schafer, entitled "On the Behavior of Minimax FIR Digital Hilbert Transformers" and is found in The Bell System Technical Journal, Vol. 53, No. 2, Feb. 1974, pages 363–390. Another published article is by B. Gold, A. V. Oppenheim and C. M. Rader, entitled "Theory and Implementation of the Discrete Hilbert Transform," and is found in IEEE Proceedings, Symposium on Computer Processing in Communications, Polytechnic Institute of Brooklyn, 1970, pages 235–250. Each of these articles is basically an extension of the previously discussed prior art philosophy and deal with the construction of an all-pass filter to provide a controlled phase shift.

Another type of signal processing system for performing a Hilbert transformation is disclosed in U.S. Pat. No. 3,800,131, issued Mar. 26, 1974, entitled "HILBERT TRANSFORMER", by S. A. White. While this system performs a precise Hilbert transformation without trying to be an all-pass filter, the system is mechanized to process analog signals. In many present-day communications applications, the transmission of digital data is required. Therefore, for these applications a digital system for performing the Hilbert transformation is required in the interest of equipment compatibility and such operational considerations as speed, size, bulk, cost and reliability.

None of the above-described systems teaches the multiplex mechanization of a digital Hilbert transformation system for digitally performing a Hilbert transformation type of signal processing.

SUMMARY OF THE INVENTION

Briefly, a novel digital mechanization of a Hilbert transformation system is provided for digitally developing a second output signal which is the Hilbert transform of a first output signal. In a preferred embodiment, digital sine and cosine samples are selectively multiplexed by a multiplexer circuit into first and second composite signals. A first multiplier circuit selectively heterodynes the components in the first composite signal with input signal samples to develop a first plurality of data streams which are filtered and then selectively heterodyned with components in the second composite signal to develop a second plurality of data streams. A demultiplexer circuit selectively combines components in the second plurality of data streams to develop a first output signal and a second output signal which is the Hilbert transform of the first output signal.

It is therefore an object of this invention to provide an improved signal transformation system.

Another object of this invention is to provide a digital Hilbert transformation system.

A further object of this invention is to provide a multiplex mechanization of a Hilbert transformer which digitally develops two output signals, with one output signal being the Hilbert transform of the other.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
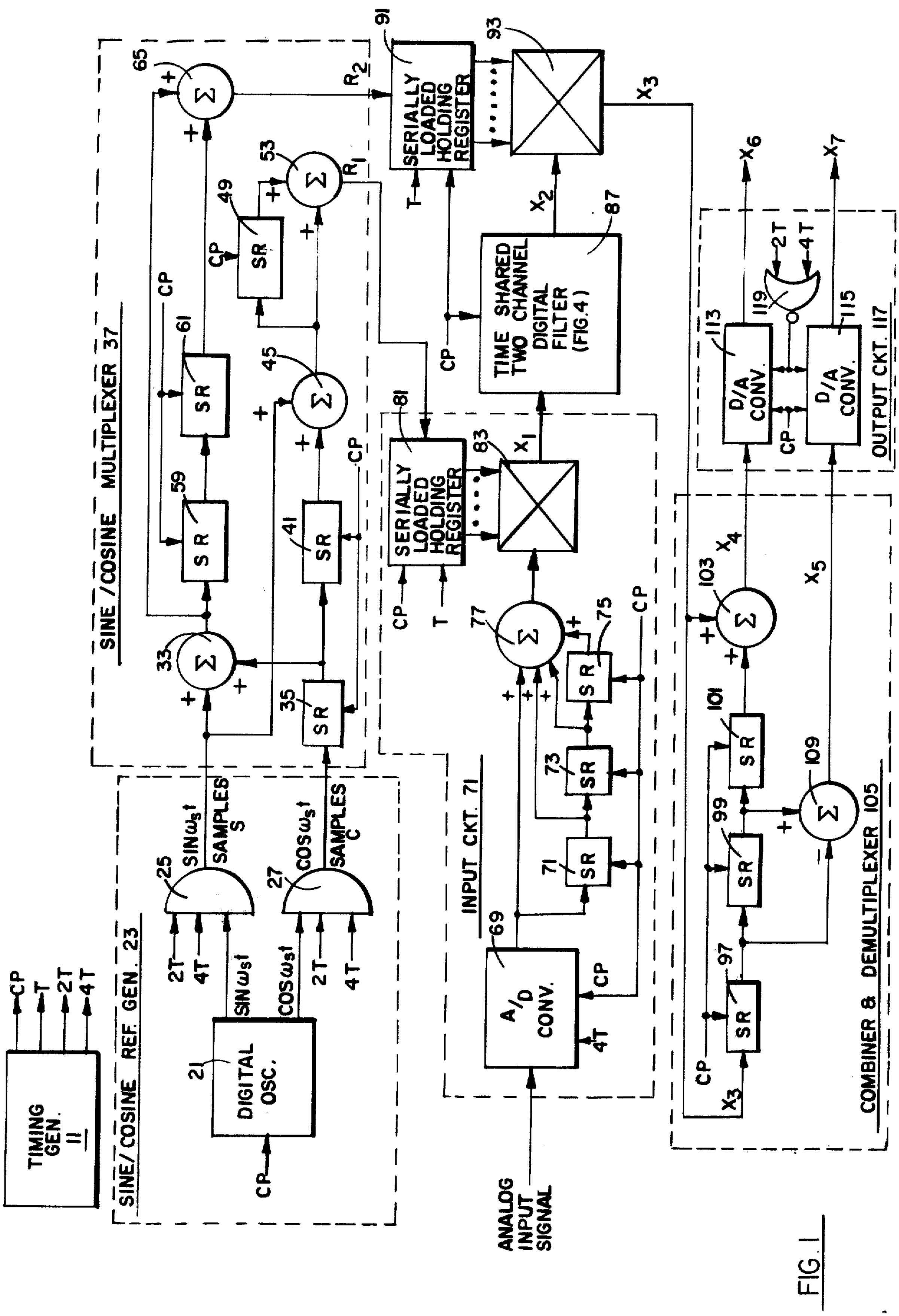
FIG. 1 is a block diagram of a preferred embodiment of the invention.

Referring now to the drawings, FIG. 1 discloses a block diagram of a preferred embodiment of the invention. To aid in the understanding of the system of FIG. 1, the signal and timing block waveforms of FIGS. 2 and 3 will also be referred to during the description of the system of FIG. 1.

A timing generator 11 generates basic clock pulses (CP) which are counted down by, for example, a sixteen-to-one frequency count-down circuit (not shown) to develop word timing pulses T. The T pulses are then counted down by a two-to-one count-down circuit (not shown) to develop 2T pulses which, in turn, are counted down by another two-to-one count down circuit (not shown) to develop 4T pulses. The CP, T, 2T and 4T pulses are utilized by the remaining circuits of FIG. 1 to obtain the proper system timing relationships and sequences. The T, 2T and 4T pulses are respectively illustrated by the waveforms 13, 15 and 17 in FIG. 2. One T pulse occurs during each of T periods of time 1–12, illustrated by the timing block waveform 19 in FIG. 2. Although no clock pulses CP are shown, it will be recalled that 16 clock pulses are generated for each of the T pulses 13 and, hence, during each of the T periods in the timing block waveform 19.

A conventional digital oscillator 21 in a sine/cosine reference generator 23 utilizes the clock pulses CP to simultaneously generate a first series of in-phase pulses which digitally correspond to a sine wave sin $\omega_s t$ reference signal and a second series of quadrature pulses which digitally correspond to a cosine wave cos $\omega_s t$ reference signal. The sin $\omega_s t$ and cos $\omega_s t$ pulses are respectively applied to AND gates 25 and 27. The 2T and 4T pulses are also applied to each of the AND gates 25 and 27. As shown by the waveforms 15 and 17 (FIG. 2), the AND gates 25 and 27 are only enabled during every fourth T period, namely T periods 1, 5, 9, etc. of the waveform 19 (FIG. 2), to respectively pass samples of the sin $\omega_s t$ and cos $\omega_s t$ pulses. The sin $\omega_s t$ samples are designated by S and illustrated by the signal block waveform 29 (FIG. 2), with $S_1$, $S_2$, $S_3$, etc., respectively designating the first, second, third, etc. sine samples. In a like manner, the cos $\omega_s t$ samples are designated by C and illustrated by the signal block waveform 31 (FIG. 2), with $C_1$, $C_2$, $C_3$, etc. respectively designating the first, second, third, etc. cosine samples.

The S and C samples are applied to a combiner or summer 33 and a shift register 35, respectively, in a sine/cosine multiplexer 37. The summer 33, like all of the remaining summers to be discussed in FIGS. 1 and 4, can be a full adder. The purpose of the multiplexer 37 is to time division multiplex the S and C samples into the proper preselected time slots in each of reference signals $R_1$ and $R_2$ (to be discussed).

The C samples are serially clocked into and through the shift register 35 at the clock pulse CP rate. The shift register 35, like all of the other shift registers to be described in FIG. 1, is basically a delay circuit which can be implemented with sixteen serially connected J-K flip-flop stages, clocked with the clock pulses CP to achieve a delay time equal to one of the T periods 19, which in turn corresponds to the length of one word time or sixteen CP times. As shown by the signal block waveform 39 (FIG. 2), the delayed $C_1$, $C_2$, $C_3$, etc. samples at the output of the shift register 35 now occur during the T periods 2, 6, 10, etc. In a similar manner, the delayed $C_1$, $C_2$, $C_3$, etc. samples at the output of the shift register 35 are each delayed for another T period by shift register 41 to now occur during the T periods 3, 7, 11, etc., as illustrated in the signal block waveform 43 (FIG. 2).

Figure 2:
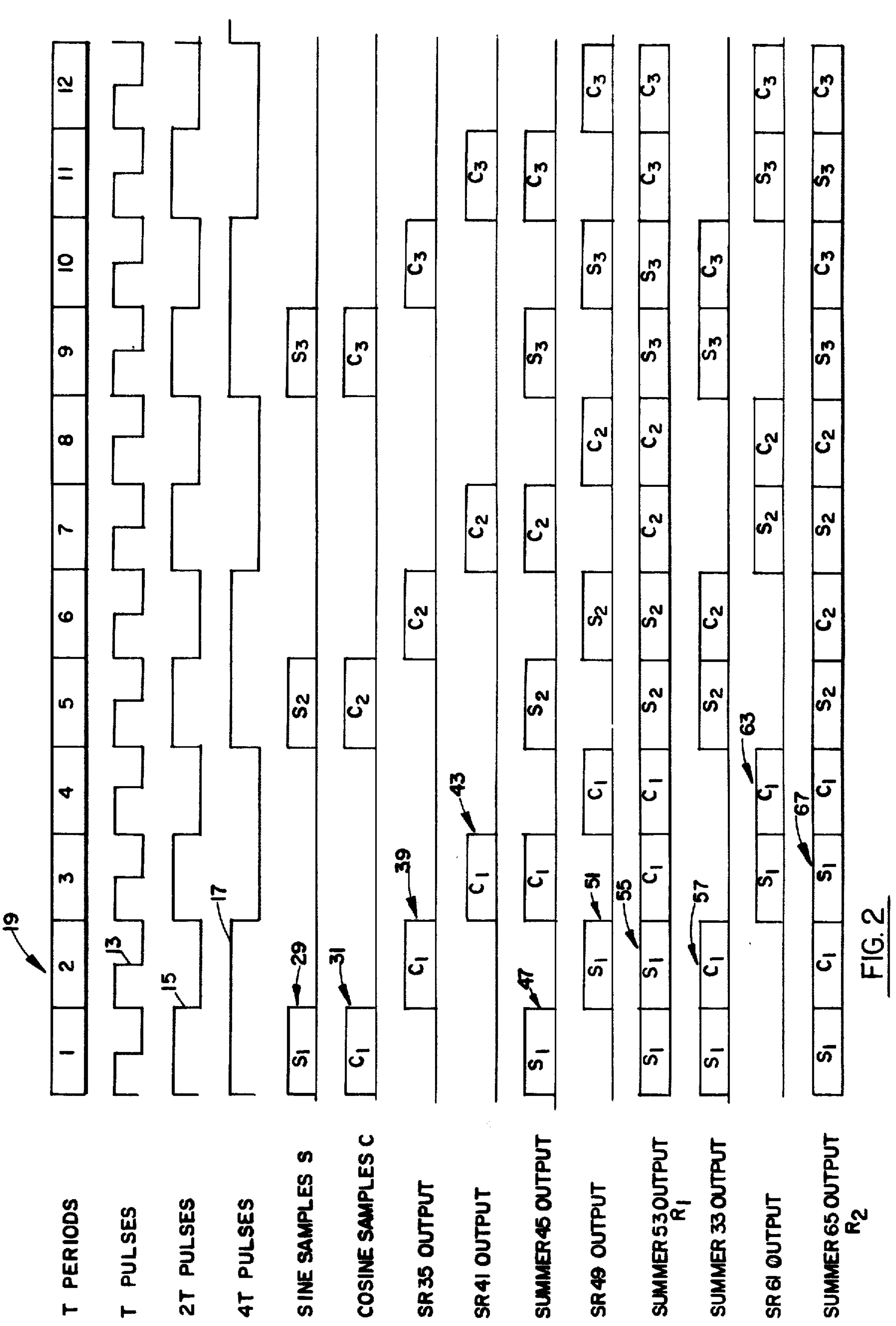
FIGS. 2 and 3 illustrate signal and timing block waveforms useful in explaining the operation of the system of FIG. 1.

A combiner or summer 45 sums the output 43 of the shift register 41 with the S samples from the AND gate 25 to develop the intermittent, interleaved S and C output illustrated by the signal block waveform 47 (FIG. 2). The output 47 of the summer 45 is delayed by one T period by a shift register 49 to develop an output illustrated by the signal block waveform 51 (FIG. 2). The output 51 of the register 49 is summed in a combiner or summer 53 with the output 47 of the summer 45 to develop a first multiplexed sine/cosine reference or composite signal $R_1$ illustrated by the signal block waveform 55 (FIG. 2). Each portion of the $R_1$ signal which occurs during any given T period is a serial group of bits that is representative of either a sin $\omega_s t$ sample or a cos $\omega_s t$ sample. For example, $S_1$ is the first sin $\omega_s t$ sample and this occurs during each of the T periods 1 and 2 of the waveform 55, $C_1$ is the first cos $\omega_s t$ sample and this occurs during each of the T periods 3 and 4 of the waveform 55, etc. It should therefore be noted that in the path encompassed by the shift registers 35, 41 and 49 and the summers 45 and 53, essentially the S and C samples were respectively time division multiplexed into alternate time slots, with each time slot having a duration of two T periods.

A second path in the sine/cosine multiplexer 37 is comprised of the summer 33 coupled through two serially-connected shift registers 59 and 61 to a summer 65. The output 39 (FIG. 2) of the shift register 35 is summed in the summer 33 with the S samples 29 (FIG. 2) from the AND gate 25 to develop an output shown by the signal block waveform 57 in FIG. 2. The output 57 comprises consecutive S and C samples, each having a duration of one T period, followed by two consecutive T periods with no samples. The output 57 from the summer 33 is delayed for two T periods by the shift registers 59 and 61 to enable the register 61 to develop an output shown by the waveform 63 in FIG. 2. The output 63 from the register 61 is summed in the summer 65 with the output 57 from the summer 33 to develop a second reference or second composite signal $R_2$. The signal $R_2$ is comprised of time division multiplexed S and C samples, illustrated by the signal block waveform 67 in FIG. 2. Each portion of the $R_2$ signal which occurs during any given T period is a serial group of bits that is representative of either a sine $\omega_s t$ or cos $\omega_s t$ sample. However, it should be noted that the various S and C samples in the $R_2$ signal were respectively time division multiplexed into alternate time slots, with each time slot having a duration of one T period. By comparing the waveforms 55 and 67, it can be seen that essentially the time slots for the multiplexed $R_1$ signals are twice as long as those for the multiplexed $R_2$ signals.

An analog imput signal is applied to an analog-to-digital (A/D) converter 69 in an input circuit 71. Every fourth T period (1, 5, 9, etc.) the rising edge of a 4T pulse enables the A/D converter 69 to sample the analog input at the clock pulse (CP) rate for the time required for one word of conversion, i.e. 16 CP or bit times, or one T period. As is well known to those skilled in the art, to counteract noise build-up the A/D converter 69 may be implemented to develop 0 state output bits for a preselected number (e.g., six) of its least significant output bits, with the remaining bits representing the digital amplitude of the sampled input signal.

Figure 3:
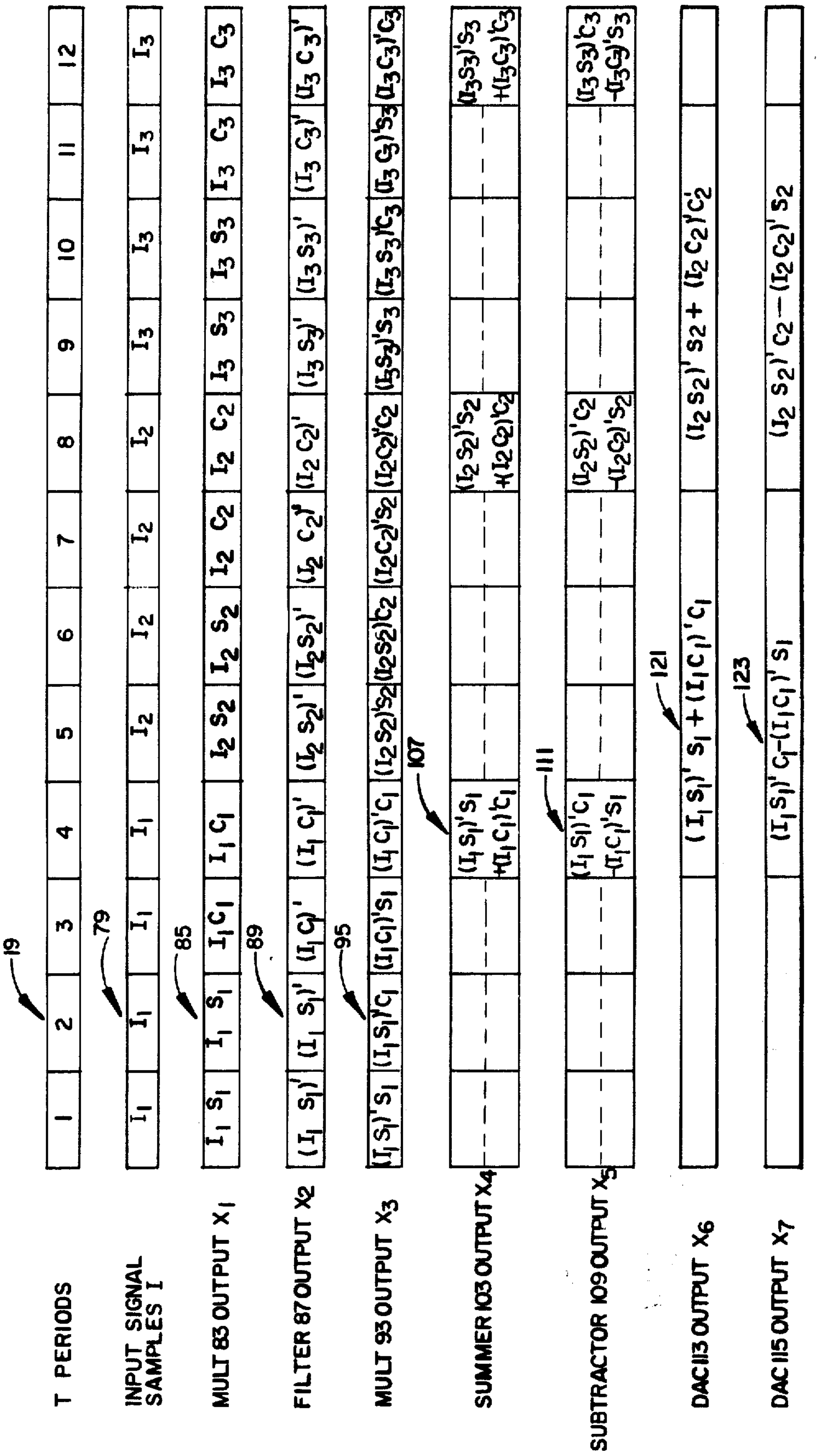

The output bits from the A/D converter 69 are sequentially applied through three serially-coupled shift registers 71, 73 and 75, with each shift register delaying its input signal by one T period. The undelayed output of the converter 69 and the differently delayed outputs of the shift registers 71, 73 and 75 are applied to a summer 77 to develop an output comprised of four consecutive identical input signal samples I, as illustrated in signal block waveform 79 (FIG. 3). Although the input signal is only sampled during every fourth T period, the shift registers 71, 73 and 75 sequentially repeat the input signal samples $I_1$ for three additional T periods. For example, while the input sample $I_1$ is derived during T period 1, it is repeated during T periods 2, 3 and 4. In a like manner, the $I_2$ sample occurs during each of T periods 5, 6, 7 and 8, and the $I_3$ sample occurs during each of T periods 9, 10, 11 and 12.

The multiplexed sine/cosine reference signal $R_1$ (waveform 55, FIG. 2) is serially fed into a conventional, serially-loaded, holding register 81 at the clock pulse rate. The register 81 may be comprised of a shift register (not shown), a holding register (not shown), and a bank of AND gates (not shown) coupled between the shift register and the holding register. Upon the application of the positive portion of a differentiated T pulse (not shown) to the AND gates, the information stored in the shift register could be swiftly transferred in parallel into the holding register. With the previous shiftregistered-stored word now stored in the holding register, the shift register can now receive and store the serial bits in the next word in the $R_1$ signal. Therefore, the register 81 essentially holds a plurality of bits, representing a first word sample until all of the bits in a second word sample have been received, at which time the first word sample is dumped out and the second word sample is held until all of the bits in a third word sample have been received, etc.

During each T period, all of the bits in the S or C word sample of the $R_1$ signal that is stored in the holding register 81 are sequentially multiplied or heterodyned in a multiplier or linear modulator 83 by all of the serial bits of the associated I sample occuring during that T period. The register 81 may be implemented to be an integral part of the multiplier 83.

As a result of the multiplication in the multiplier 83, each of the signal samples I (e.g., $I_1$is selectively heterodyned by associated sine S (e.g., $S_1$) and cosine C (e.g., $C_1$) samples, each effectively lying in alternate 2 T period time slots. In this manner a first time-division multiplexed, heterodyned sampled signal $X_1$ version of the input signal is developed. This $X_1$ signal, as illustrated by signal block waveform 85 in FIG. 3, is comprised of a sequence of interleaved products of an input sample I and an associated one of the sine samples S or cosine samples C. There are basically two streams of time division multiplexed, heterodyned data appearing at the output of the multiplier 83 during every 4T periods. An examination of the waveform 85 discloses that identical products are developed during each T period of an adjacent pair. For example, an $I_1S_1$ product is developed during each of T periods 1 and 2, and $I_1C_1$ product is developed during each of the T periods 3 and 4, etc.

The sequentially developed output sample products $I_1S_1$, $I_1S_1$, $I_1C_1$, $I_1C_1$, $I_2S_2$, $I_2S_2$, $I_2C_2$, $I_2C_2$, etc. in the $X_1$ signal are sequentially shaped by a preselected transfer function in a multiplexed or time-shared, two-channel digital filter 87 (FIG. 4) to develop an $X_2$ signal having the desired frequency response characteristics. The $X_2$ signal, as illustrated in signal block waveform 89 in FIG. 3, is comprised of the sequentially filtered sample products $(I_1S_1)^1$, $(I_1S_1)^1$, $(I_1C_1)^1$, $(I_1C_1)^1$, $(I_2S_2)^1$, $(I_2S_2)^1$, $(I_2C_2)^1$, $(I_2C_2)^1$, etc., where $( )^1$ designates that the contents of the parentheses have been digitally filtered by the filter 87.

A serially-loaded holding register 91 and multiplier 93 combination, similar in structure and operation to the register 81 and multiplier 83 combination, is responsive to the $R_2$ and $X_2$ signals for developing a second multiplexed heterodyned serial data signal $X_3$. More specifically, the $R_2$ signal (waveform 67, FIG. 2) is serially fed into and stored in the register 91. During each T period all of the bits in the S or C word sample of the stored $R_2$ signal are sequentially multiplied or heterodyned in a multiplier 93 by all of the serial bits of the associated filtered word sample in the $X_2$ signal from the filter 87, that occur during that T period. In this manner, each of the filtered word samples in the $X_2$ signal is selectively heterodyned by the associated sine S (e.g., $S_1$) and cosine C (e.g., $C_1$) samples, lying in alternate 1T period time slots, in order to develop the resultant interleaved $X_3$ signal illustrated by signal block waveform 95 in FIG. 3. As shown in the waveform 95, the $X_3$ signal basically comprises a sequence of interleaved products of the filtered output samples from the filter 87 with a selective sequence of associated sine and cosine samples S and C in the $R_2$ signal. This sequence of interleaved products forms four streams of time division multiplexed, second heterodyned data composed of the filtered two signal streams of data from the filter 87 which have been selectively heterodyned by the multiplexed, in-phase and quadrature components, S and C, of the reference signal $R_2$.

The $X_3$ signal which is comprised of the four streams of interleaved data, is sequentially clocked through shift register 97, 99 and 101 to a combiner or summer 103 in a combiner and demultiplexer 105. It will be recalled that each of the shift registers in FIG. 1 causes a delay of one T period of any data applied thereto. The $X_3$ signal from the multiplier 93 is also applied directly to the combiner 103 where it is summed or combined with the three T period delayed $X_3$ output from the register 101 to develop a demultiplexed output signal $X_4$. The $X_4$ signal is illustrated by signal block waveform 107 in FIG. 3. An examination of the waveform 107 discloses that the demultiplexed output $X_4$, that is developed during T period 4 is comprised of the undelayed $X_3$ signal developed during T period 4 and of the $X_3$ signal developed during T period 1 that was delayed by three T periods. It should also be noted that the $X_4$ signal is not interleaved, as was the $X_3$ signal.

The combiner and demultiplexer 105 also subtracts the output of the shift register 97 from the output of the shift register 99 in a combiner or subtractor 109 to develop a demultiplexed output signal $X_5$. The $X_5$ signal is illustrated by signal block waveform 111 in FIG. 3. The waveform 111 discloses that the demultiplexed output $X_5$ that is developed during, for example, T period 4 is comprised of the difference between the $X_3$ signal that was developed during T period 2 but delayed by two T periods and the $X_3$ signal that was developed during T period 3 but delayed by one T period. The demultiplexed output $X_5$ is the Hilbert transform of the demultiplexed output $X_4$. It can thus be seen that the combiner and demultiplexer 105 is essentially comprised of two output channels. One channel comprises the shift registers 97, 99 and 101 and the summer 103 to develop the $X_4$ output. The other channel comprises the shift registers 97 and 99 and the subtractor 109 to develop the $X_5$ output. By this means the combiner and demultiplexer 105 combines the four interleaved data streams in the $X_3$ signal (waveform 95, FIG. 3) into pairs of noninterleaved signals to get the desired $X_4$ and $X_5$ signals.

The $X_4$ and $X_5$ signals from the combiner and demultiplexer 105 are respectively applied to digital-to-analog (D/A) converters 113 and 115 in output circuit 117. The converters 113 and 115 are enabled to convert the digital $X_4$ and $X_5$ signals into analog signals $X_6$ and $X_7$, respectively, by a 1 state signal from a NOR gate 119. The 2T and 4T pulses, as shown by the waveforms 15 and 17 in FIG. 2, are applied as inputs to the NOR gate 119 to enable the gate 119 to develop 1 state outputs only during T periods 4, 8, 12, etc. As a result, the D/A converters 113 and 115 convert into analog output signals $X_6$ and $X_7$ only those samples in the digital signals $X_4$ and $X_5$ which occur during T periods 4, 8, 12, etc. It does not matter what output samples the summer 103 and subtractor 109 develop during T periods 1, 2, 3, 5, 6, 7, 9, 10, 11, etc., since no subsequent digital-to-analog conversion occurs during those periods.

The $X_6$ and $X_7$ signals are illustrated by signal block waveforms 121 and 123 in FIG. 3. As shown in the waveforms 121 and 123, the parts of the analog output signals $X_6$ $X_7$ that are developed during T period 4 are held until the start of T period 8, during which T period additional parts of the analog output signals $X_6$ and $X_7$ are developed, and then held until the start of T period 12 and so forth.

Figure 4:
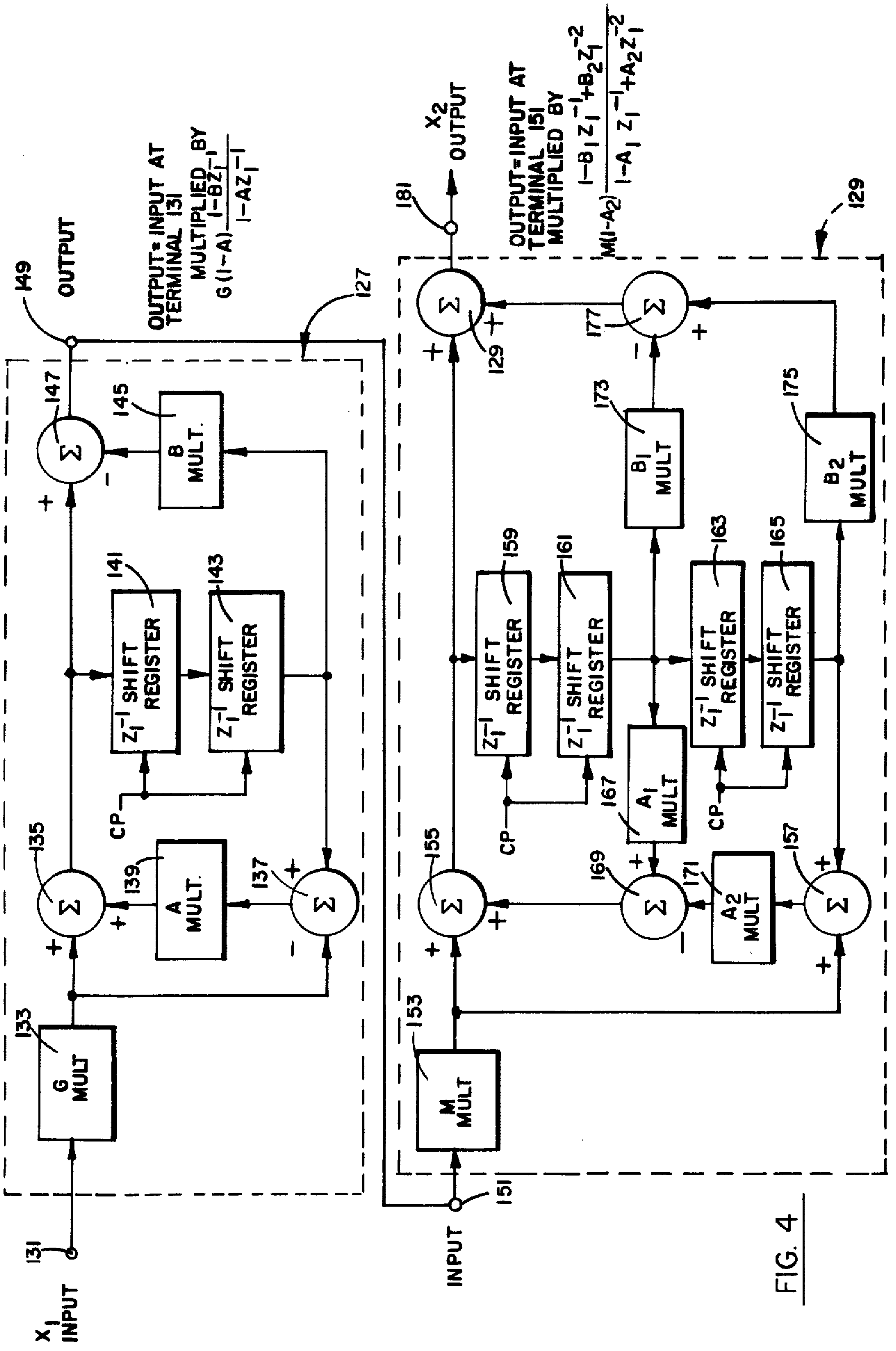
FIG. 4 illustrates an example of the time-shared, two-channel digital filter of FIG. 1.

Referring now to FIG. 4, an example of a digital filter 87 which may be used in FIG. 1 is illustrated. It is well known that any digital filter, such as the filter 87, may be decomposed into elemental first-order and second-order sections. Therefore, the exemplary digital filter 87 of FIG. 4 is illustrated as being comprised of cascaded, elemental first-order and second-order sections 127 and 129, respectively. Other cascaded or parallel combinations, or both, of the sections 127 and 129 may be utilized in the filter 87, depending upon the desired requirements of the system of FIG. 1.

The $X_1$ signal from the multiplier 83 is applied to an input terminal 131 of the section 127. By referring to the waveform 85 in FIG. 3, it will be recalled that the $X_1$ signal is essentially comprised of two streams of interleaved serial data samples. One stream of data is comprised of blocks of two consecutive $I_1S_1$ data samples, two consecutive $I_2S_2$ data samples, two consecutive $I_3S_3$ data samples, etc., which respectively occur during the T periods 1 and 2, 5 and 6, 9 and 10, etc. The other stream of data is comprised of blocks of two consecutive $I_1C_1$ data samples, two consecutive $I_2C_2$ data samples, two consecutive $I_3C_3$ data samples, etc., which respectively occur during the T periods 3 and 4, 7 and 8, 11 and 12, etc.

Each data sample in the $X_1$ signal is multiplied by a quantity G in a multiplier 133, before being applied to a summer 135 and a subtractor 137. The output of the subtractor 137 is multiplied by a coefficient A in a feedback multiplier 139, before being summed with the output of the multiplier 133 in the summer 135. The coefficient A determines the pole frequency of the filter section 127. The output of the summer 135 contains two streams of modified interleaved serial data samples. Each of the modified data samples is sequentially delayed for four T periods by two cascaded, $Z_1^{-1}$ shift registers 141 and 143 before being applied to the subtractor 137. The term $Z_1^{-1}$ defines a two-word delay. The shift register 141 and 143, like all of the other shift registers to be described in FIG. 4, are each basically a delay circuit which can be implemented with 32 serially coupled J-K flip-flop stages, clocked with the clock pulses CP to achieve a delay time equal to two of the T periods 19, which in turn corresponds to the length of two word times or 32 CP times. As a result, each data sample from the multiplier 133 (e.g., a multiplied $I_2S_2$ data sample) is in synchronization with the delayed data sample from the register 143 (e.g., a modified multiplied delayed $I_1S_1$ data sample).

Each data sample from the multiplier 133 is subtracted in the subtractor 137 from the associated data sample from the register 143 to complete or close a feedback path in the section 127. There is a difference in amplitude between the amplitudes of the input data samples to the subtractor 137 because the sample from the register 143 is delayed by four T periods with respect to that from the multiplier 133.

Each of the delayed data samples from the shift register 143 is sequentially multiplied by a coefficient B in a feedforward multiplier 145, before being subtracted in a subtractor 147 from the output of the summer 135 to complete or close a feed forward path in the section 127. The coefficient B determines or sets the zero frequency of the filter section 127.

The digitally filtered output of the section 127 is applied to a terminal 149. The output at the terminal 149 is equal to the input multiplied by the transfer function of the section 127 which, in turn, is equal to $$G(1-A)\ \frac{1-BZ_1^{-1}}{1-AZ_1^{-1}},$$

where $Z_1^{-1} = \epsilon^{-2sT}$, $s$ = Laplace variable, and $T$ = a $T$ period to show that $Z^{-1}$ = a two word delay.

Each data sample in the output from the terminal 149 of the first order section 127 is applied via an input terminal 151 of the second order section 129 to a multiplier 153 where it is multiplied by a quantity M. The output of the multiplier 153 is applied to summers 155 and 157.

The output of the summer 155 is delayed for eight T periods by four cascaded, $Z_1^{-1}$ shift registers 159, 161, 163 and 165. The 4T delayed output of the register 161 is multiplied by a coefficient $A_1$ in a first feedback multiplier 167 before being applied to a subtractor 169. The 8T period delayed signal at the output of the register 165 is summed with the output of the multiplier 153 in the summer 157. The summed output of the summer 157 is multiplied by a coefficient $A_2$ in a second feedback multiplier 171 before being subtracted from the output of the multiplier 167 in the subtractor 169. The difference signal from the subtractor 169 is then summed in the summer 155 with the output of the multiplier 153 to complete the first and second feedback paths in the second order section 129.

The delayed outputs from the registers 161 and 165 are respectively multiplied by coefficients $B_1$ and $B_2$ in first and second feedforward multipliers 173 and 175, respectively. The output from the multiplier 173 is subtracted in a subtractor 177 from the output from the multiplier 175. The difference signal from the subtractor 177 is then summed with the output of the summer 155 in a summer 179 to complete the first and second feedforward paths in the second order section 129.

The digitally filtered output of the section 129 appears at terminal 181 as the $X_2$ output of the digital filter 87. The $X_2$ output is equal to the $X_1$ input signal multiplied by the transfer function of section 127 (previously given) multiplied by the transfer function of the section 129, which is equal to $$M(1-A_2)\ \frac{1-B_1Z_1^{-1}+B_2Z_1^{-2}}{1-A_1Z_1^{-1}+A_2Z_1^{-2}}$$

where $Z_1^{-1}=e^{-2ST}$, $Z_1^{-2}=e^{-4ST}$, $T$ = a T period, the coefficients $A_1$ and $A_2$ determine the pole frequency and the coefficients $B_1$ and $B_2$ set the zero frequency of the section 129.

A more specific treatment of digital filters can be found in U.S. Pat. No. 3,639,739, particularly in relation to the first order filter section of FIG. 5 and the second order filter section of FIG. 10.

To further clarify the invention, it will now be mathematically illustrated how the system of FIG. 1 develops the Hilbert transform $X_7$ of the signal $X_6$.

Let capital letters, such as X, H and R, indicate frequency domain representations, and small letters, such as $x$ and $y$, indicate time domain representations. In addition, the following definitions will be used:

$\circledast$ = a sampled quantity
$*$ = A convolution operator
$T$ = a timing interval tion of frequency domain samples in the time domain, as is done, corresponds to a convolution of the frequency domain samples in the frequency domain.

The output of the filter 87 is equal to the input to the filter 87 times the frequency response or transfer function of the filter 87. The filter 87 output is given by $$X_2^*(\omega) = X_1^*(\omega)\ H(e^{+j4\ \omega\ T}). \qquad (5)$$

We wish the baseband filter to exhibit some particular frequency response for each channel. This desired single-channel transfer function is $H(z_2)$ where $z_2 = e^{j4ST}$ since the input sampling interval is indeed 4T. The frequency response of the sampled filter is therefore $H(e^{+j\ \ T})$, expressed in equation 5.

The second interleaved composite sine/cosine reference signal $R_2$ to the register 91 and multiplier 93 combination is given by $$R_2^*(\omega) = [j + e^{-j\ \omega\ T}]\ [1 + e^{-2j\ \omega\ T}]\ H_1(\omega) \sum_{n=-\infty}^{\infty} \delta \left(\omega_c - \frac{n}{4}\omega_s\right) \quad . (6)$$

$\omega_s = (2\pi/T)$ = the sampling frequency
$k$ = any positive integer
$e^{-jk\ \omega\ T}$ = a delay of $k$ T-periods $$H_k(\omega) = \frac{1 - e^{-jkT\ \omega}}{j\omega} \quad = \text{a hold of k T-periods}$$

Let $X_l(\omega)$ represent the analog input signal to the A/D converter 69. Then the sampled input can be given by:

$$X_l^*(\omega) = \frac{1}{4T} \sum_{n=-\infty}^{\infty} X_l\left(\omega - \frac{n}{4}\omega_s\right) \ . \qquad (1)$$

and the sampled and held output of the summer 77 to the multiplier 83 can be given by:

$$X_s I(\omega) = X_l^*(\omega)\ H_4(\omega). \qquad (2)$$

The composite first interleaved sine/cosine reference signal to the register 81 and multiplier 83 combination is $$R_1^*(\omega) = [j + e^{-j2\ \omega\ T}] H_2(\omega) \sum_{n=-\infty}^{\infty} \delta \left(\omega_c - \frac{n}{4}\omega_s\right) \qquad (3)$$

The time-division-multiplexed, heterodyned, sampled signal output of the multiplier 83 can be given by $$X_1^*(\omega) = X_s^*(\omega) \circledast R_1(\omega), \qquad (4)$$

where the frequency domain, sampled and held input signal $X_s^*(\omega)$ is effectively convolved with the sampled and held, first interleaved, composite sine/cosine reference signal $R_1^*(\omega)$. It is well known that a multiplica- Consequently, the output of the multiplier 93 can be given by $$X_3^*(\omega) = X_2^*(\omega) \circledast R_2^*(\omega) \qquad (7)$$

where each bit in the serial data output of the filter 87 is sequentially multiplied in the time domain by the second interleaved composite sine/cosine reference signal $R_2^*(\omega)$. This multiplication, like that occurring in the multiplier 83, corresponds to convolving the frequency domain sampled $X_2^*(\omega)$ and $R_2^*(\omega)$ factors in the frequency domain.

The $X_4$ output of the summer 103 can be represented by $$X_4^*(\omega) = X_3^*[1 + e^{-j3\ \omega\ T}] \qquad (8)$$

to show the summation of the undelayed and 3T delayed output $X_3$ from the multiplier 93.

In a like manner, the $X_5$ output of the subtractor 109 can be represented by $$X_5^*(\omega) = X_3^*[e^{-2j\ \omega\ T} - e^{-j\ \omega\ T}] \qquad (9)$$

to show the subtraction of the 1T and 2T delayed output $X_3$ from the multiplier 93.

The digital-to-analog conversion of the signals in equations (8) and (9) produces the analog signals $X_6(\omega)$ and $X_7(\omega)$. After performing the indicated substitutions and mathematical operations in the above equations (1) through (9), the outputs of the D/A converters 113 and 115 may be given by:

$$X_6(\omega) = \tfrac{1}{2} H_4(\omega)\ X_l^*(\omega) \left\{ H\ [e^{4j(\omega - \omega_c)T}] + H\ [e^{4j(\omega + \omega_c)T}] \right\} \qquad (10)$$

and $$X_7(\omega) = -\frac{j}{2} H_4(\omega) X_l^*(\omega) \left\{ H\ [e^{4j(\omega - \omega_c)T}] - H\ [e^{4j(\omega + \omega_c)T}] \right\} \ (11)$$

In mathematically comparing the equations (10) and (11), it can be seen that except for the influence of the hold circuit, $H_4(\omega)$, the signal frequency components of $X_7(\omega)$ are shifted in phase by 90° with respect to the signal frequency components of $X_6(\omega)$, but, other than that, the $X_6(\omega)$ and $X_7(\omega)$ signals have undergone the same transformation. As a result, the operational equivalent of the equations (10) and (11) can be represented by the block diagram of FIG. 5.

Figure 5:
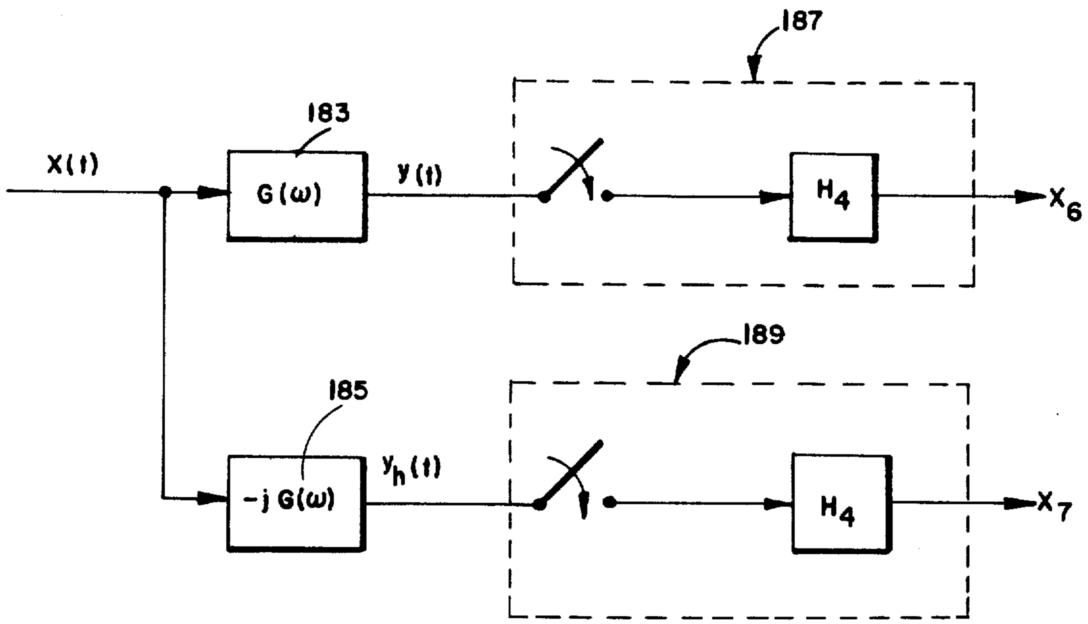
FIG. 5 illustrates a simple model of the system of FIG. 1 to basically explain the operation of FIG. 1.

FIG. 5 is basically a simple model of the system of FIG. 1. In FIG. 5, an analog input signal $x(t)$ is operated on by a transfer function $G(\omega)$ in a unit 183 to yield a signal component $y(t)$. The input signal $x(t)$ is also transformed by an identical transfer function $-jG(\omega)$ in a unit 185 to yield a signal $y_h(t)$, which is the Hilbert transform of $y(t)$. The signals $y(t)$ and $y_h(t)$ are respectively sampled at each fourth T period (4, 8, 12, etc.) and each held for a total of 4T periods (4 through 7, 8 through 11, etc.) by sample and hold circuits 187 and 189, respectively, to develop the $X_6$ and $X_7$ signals.

The invention thus provides a multiplex mechanization of a Hilbert transformation system wherein, in a preferred embodiment, a first multiplier circuit selectively heterodynes multiplexed sine and cosine samples in a first composite signal with input samples to develop first and second streams of data which are filtered and then selectively heterodyned with multiplexed sine and cosine samples in a second composite signal to develop a plurality of streams of data, which are selectively demultiplexed into a first output signal and a second output signal that is the Hilbert transform of the first output signal.

While the salient features have been illustrated and described in a preferred embodiment of the invention, it should be readily apparent to those skilled in the art that many changes and modifications can be made in the preferred embodiment without departing from the spirit and scope of the invention. For example, the preferred embodiment of FIG. 1 could be readily modified to operate with parallel rather than serial data, or with other types of multiplexing. For instance, the reference sine and cosine signals could each be placed on a separate carrier and the rest of the system suitably modified to operate with frequency division multiplexing, instead of time division multiplexing. It is therefore intended to cover all such changes and modifications of the invention that fall within the spirit and scope of the invention as set forth in the appended claims.

What is claimed is:

1. A digital Hilbert transformation system comprising
- first means for generating first and second reference signal samples in mutual phase quadrature with each other;
- multiplexing means for selectively time division multiplexing the first and second reference signal samples into first and second time slots and for selectively time division multiplexing the first and second reference signal samples into third and fourth time slots;
- input means responsive to an input signal and to the first and second reference signal samples in the first and second time slots for selectively developing first and second transformed signal samples;
- second means for selectively heterodyning the first and second transformed signal samples with the first and second reference signal samples in the third and fourth time slots to develop a plurality of product signals; and
- demultiplexing means being selectively responsive to components of the plurality of product signals for providing first and second output signals, the first output signal having first frequency components and the second output signal having second frequency components which are shifted in phase by 90° from the respective first frequency components of the first signal.

2. The system of claim 1 wherein said demultiplexing means includes:
- first digital tapped delay means being responsive to the plurality of product signals for providing a plurality of different time delayed plurality of product signals;
- first and second combining means being selectively responsive to the plurality of differently time delayed plurality of product signals for developing first and second combined signals; and
- first and second circuits for sampling and holding the first and second combined signals, respectively, to develop the first and second output signals.

3. The system of claim 1 wherein said first means includes:
- third means for developing digital sine and cosine signals; and
- third and fourth circuits for sampling the digital sine and cosine signals, respectively, to develop the first and second reference signal samples.

4. The system of claim 1 wherein said multiplexing means includes:
- first delay means for delaying the first reference sample by a first time interval to develop a first delayed first reference sample;
- first multiplexer means responsive to the first delayed first reference sample and to the second reference sample for selectively time division multiplexing the first and second reference signal samples into the first and second time slots; and
- second multiplexer means responsive to the first delayed first reference sample and to the second reference sample for selectively time division multiplexing the first and second reference signal samples into the third and fourth time slots.

5. The system of claim 4 wherein said first multiplexer means includes:
- second delay means for delaying the first delayed first reference signal sample by a second time interval to develop a twice delayed first reference sample;
- fourth means for combining the twice delayed first reference signal sample with the second reference signal sample to develop a first interleaved signal;
- third delay means for delaying the first interleaved signal by a third time interval to produce a delayed first interleaved signal; and
- fifth means responsive to the first interleaved signal and the delayed first interleaved signal for selectively time division multiplexing the first and second reference signal samples into the first and second time slots.

6. The system of claim 4 wherein said second multiplexer means includes:
- sixth means for combining the first delayed first reference signal sample with the second reference signal sample to develop a second interleaved signal;
- fourth delay means for delaying the second interleaved signal by a fourth time interval to produce a delayed second interleaved signal; and
- seventh means responsive to the second interleaved signal and the delayed second interleaved signal for selectively time division multiplexing the first and second reference signal samples into the third and fourth time slots.

7. The system of claim 6 wherein said first multiplexer means includes:

said delay means for delaying the first delayed first reference signal sample by a second time interval to develop a twice delayed first reference sample;

fourth means for combining the twice delayed first reference signal sample with the second reference signal sample to develop a first interleaved signal;

third delay means for delaying the first interleaved signal by a third time interval to produce a delayed first interleaved signal; and fifth means responsive to the first interleaved signal and the delayed first interleaved signal for selectively time division multiplexing the first and second reference signal samples into the first and second time slots.

8. The system of claim 1 wherein said input means includes:

first heterodyning means responsive to the input signal and to the first and second reference signal samples in the first and second time slots for developing a first time division multiplexed heterodyned signal; and filter means responsive to the first time division multiplexed heterodyned signal for developing the first and second transformed signal samples.

9. The system of claim 8 wherein said first heterodyning means includes:

means for sampling and holding the input signal, and first multiplier means responsive to the sampled and held input signal and to the first and second reference signal samples in the first and second time slots for developing the first time division multiplexed heterodyned signal.

10. A digital Hilbert transformation system comprising:

first means for generating first and second reference signal samples in mutual phase quadrature with each other;

first multiplexing means for alternately multiplexing the first and second reference signal samples into first and second time slots;

second multiplexing means for alternately multiplexing the first and second reference signal samples into third and fourth time slots;

input means responsive to an input signal and to the first and second reference signal samples in the first and second time slots for alternately developing first and second transformed signals;

second means for selectively heterodyning the first and second transformed signals with the first and second reference signal samples in the third and fourth time slots to develop first and second product signals;

first demultiplexing means being responsive to first selected components of the first and second product signals for providing a first output signal having first frequency components; and second demultiplexing means being responsive to second selected components of the first and second product signals for providing a second output signal, the second output signal having second frequency components which are shifted in phase by 90° from the respective first frequency components of the first signal.

11. A digital Hilbert transformation system comprising:

first means for digitally developing sine and cosine reference samples of a reference frequency signal;

second means being responsive to the sine and cosine reference samples for developing a first multiplexed output;

third means being responsive to the sine and cosine reference samples for developing a second multiplexed output;

fourth means for heterodyning input signal samples with the first multiplexed output to develop a first multiplexed heterodyned data output;

fifth means being responsive to the first multiplexed heterodyned data output for providing a filtered output signal having the desired frequency response characteristics;

sixth means for heterodyning the filtered output signal with the second multiplexed output to develop a second multiplexed heterodyned data output; and seventh means for selectively combining components in the second multiplexed heterodyned data output to provide first and second output signals, the second output signal having frequency components which are shifted in phase by 90° from corresponding frequency components in the first output signal.

12. A digital Hilbert transformation system comprising:

a reference generator for developing sine and cosine reference samples of a reference frequency signal;

a first multiplexer for multiplexing the sine and cosine reference samples into a first composite signal;

a second multiplexer for multiplexing the sine and cosine reference samples into a second composite signal;

first multiplier means for selectively heterodyning the multiplexed sine and cosine reference samples in the first composite signal with input signal samples to develop first and second streams of data;

filter means for selectively filtering the first and second streams of data;

second multiplier means for selectively heterodyning the multiplexed sine and cosine reference samples in the second composite signal with the filtered first and second streams of data to develop third, fourth, fifth and sixth streams of data;

output means for selectively combining the third, fourth, fifth and sixth streams of data into first and second output signals, the second output signal being the Hilbert transform of the first output signal.

* * * * *

UNITED STATES PATENT AND TRADEMARK OFFICE

CERTIFICATE OF CORRECTION

PATENT NO. : 3,908,114

DATED : September 23, 1975

INVENTOR(S) : Stanley A. White

It is certified that error appears in the above-identified patent and that said Letters Patent are hereby corrected as shown below:

Column 9, lines 15 and 16, change " ⊛ = a sampled quantity
* = A convolution operator" to -- * = a sampled quantity
⊛ = a convolution operator -- line 43, change "$X_sI(\omega) = X_I^*(\omega)\, H_4(\omega)$. (2)"

to --$X_s^*(\omega) = X_I^*(\omega)\, H_4(\omega)$. (2) --

Column 10, line 14, change "$H(e^{+j\ T})$," to --$H(e^{+j\omega T})$, --

Signed and Sealed this

Tenth Day of August 1976

[SEAL]

*Attest:*

RUTH C. MASON
*Attesting Officer*

C. MARSHALL DANN
*Commissioner of Patents and Trademarks*